United States Patent [19]

Brown

[11] 4,258,501

[45] Mar. 31, 1981

[54] SEED SPROUTING APPARATUS AND METHOD

[75] Inventor: Bruce M. Brown, Seattle, Wash.

[73] Assignees: Lawrence C. Calvert, II; Richard C. Kiltz, both of Seattle, Wash.

[21] Appl. No.: 66,651

[22] Filed: Aug. 15, 1979

[51] Int. Cl.³ .............................................. A01G 31/02
[52] U.S. Cl. ......................................... 47/16; 47/39; 47/65; 47/62; 47/82; 47/84
[58] Field of Search ............. 47/14, 16, 39, 65, 82–83, 47/62, 84

[56] References Cited

U.S. PATENT DOCUMENTS

| | | | |
|---|---|---|---|
| 2,169,701 | 8/1939 | Lund | 47/16 |
| 2,725,673 | 12/1955 | Perin | 47/61 |
| 3,233,366 | 2/1966 | Nutile et al. | 47/16 |
| 3,768,201 | 10/1973 | Yoo | 47/16 |
| 3,911,619 | 10/1975 | Dedolph | 47/14 |
| 3,991,514 | 11/1976 | Finck | 47/16 X |

FOREIGN PATENT DOCUMENTS

| | | | |
|---|---|---|---|
| 2602788 | 7/1977 | Fed. Rep. of Germany. | |
| 473012 | 10/1937 | United Kingdom | 47/16 |
| 1167753 | 10/1969 | United Kingdom | 47/61 |
| 1374076 | 11/1974 | United Kingdom | 47/61 |

*Primary Examiner*—Robert E. Bagwill
*Attorney, Agent, or Firm*—Graybeal & Uhlir

[57] ABSTRACT

A plurality of perforated individual seed germinating and sprout growing bags are suspended from sets of portable racks which are placed on circular tray structures. The tray structures are supported in spaced vertical relationship by an upright mast located within an enclosed housing and adapted to rotate about its longitudinal axis. The rack sets of each tray structure are arranged about the longitudinal axis of the mast to form circular tiers. Periodically, filtered and anti-bacterially treated irrigation water is supplied to each bag at a fast enough rate to thoroughly mix the seeds located therein. Water draining from the bags is collected in a storage tank and subsequently recycled after first being filtered and purified. Once the seeds have sprouted, artificial light is provided so that substantially all the sprouts in each bag receive a uniform amount of growing light.

46 Claims, 8 Drawing Figures

SEED SPROUTING APPARATUS AND METHOD

BACKGROUND OF THE INVENTION

1. Field of the Invention

This invention relates to the germination of seeds and more specifically to an apparatus and method for hydroponically growing sprouts in a controlled environment.

2. Description of the Prior Art

Various types of apparatuses and methods have been utilized to sprout and grow vegetables, grasses and other plants hydroponically, i.e. without the use of soil. Such apparatuses commonly utilize large trays or containers in which seeds are initially placed and then periodically moistened to facilitate germination and growth. A stationary, rectangular shaped frame structure is generally provided for supporting the trays in vertical stacks. Examples of such structures are disclosed by Lund, U.S. Pat. Nos. 2,169,701; Perlin, 2,725,673; Finck, 3,991,514; Lund, Great Britain Pat. No. 473,012; La Culture Sans Terre S.A., Great Britain Pat. No. 1,176,753; Gordon, Great Britain Pat. No. 1,374,076; and, Gruber, German Offenlegungsschrift No. 2,602,788. Since all of these patents utilize rather large containers for germinating the seeds and growing the seedlings, subsequently packaging the seedlings into convenient consumer size quantitites for distribution involves a time consuming, expensive additional operation.

The growing trays and their associated frame structures have, in some instances, been placed within enclosed housings with the air within the housing maintained at a constant temperature by either heating or cooling. Examples of such heated housings are disclosed by the aforementioned patents to Lund 2,169,701 and 473,012, Perlin 2,725,673, Finck 3,991,514 and Gruber 2,602,788.

Artificial lights have been employed to facilitate the growth of the plants once they have germinated. In the Gruber 2,602,788 Offenlegungsschrift, artificial lights are disposed vertically along the inside of surface of the housing wall while in the Finck 3,991,514 patent the lights are disposed horizontally along the inside surface of the housing wall. A shortcoming resulting from placing lights only along the interior walls of the housing is that light is not uniformly distributed throughout the housing so that the farther a plant is located from the housing walls, the less light the plant will receive. Another type of lighting installation is disclosed by Lund, U.S. 2,169,701 patent wherein lights are disposed along the ceiling of the housing. Placing the lights in this location, however, only permits plants in the uppermost trays of the stack of trays to receive light.

In some apparatuses for hydroponically growing plants, the irrigation water is recirculated. Attempts have been made to filter the recirculated water to remove contaminates such as seed hulls, fragments of roots, fungus or mold spores. In the above mentioned Finck, 3,991,514 and Gordon, 1,374,076 patents, a filter is placed in the water line between the nozzles used to discharge the water onto the growing plants and the pump used to pump water to the nozzles. Merely filtering the irrigation water, however, has not prevented the growth of fungus or mold within the warm, moisture laden environment in which plants are typically hydroponically grown. Often fungicides and other chemicals must be added to the water to adequately control fungus problems. For example, the Finck, 3,991,514 patent discusses adding a fungicide known as alkyl dimethyl benzyl ammonium chloride to the water to reduce the growth of fungus within the chamber walls.

Another type of apparatus for sprouting seeds is disclosed by Yoo, U.S. Pat. No. 3,768,201 wherein a single container is supported within a larger chamber. The larger chamber also serves as a storage container for water used to periodically spray the seeds and sprouts located within the smaller container. A heating coil is located within the bottom portion of the larger container to heat the water stored therein. Also, artificial light bulbs are disposed along the ceiling of the larger chamber to shine downwardly on the plants located within the container to foster photosynthesis of the sprouted seeds.

SUMMARY OF THE INVENTION

The present invention relates to a novel apparatus and method for sprouting various types of seeds for human consumption. In basic form, the apparatus is comprised of a plurality of partially translucent, horizontally disposed shelf structures which are vertically spaced along the height of an upright mast located within an enclosed housing. The mast and the shelf structures are supported for rotation about the longitudinal axis of the mast. Sets of portable racks, which are arranged in tiers about a center corresponding to the vertical axis of the mast, are supported by each shelf structure. A plurality of perforated, upwardly open receptacles in the form of transparent, flexible, plastic bags used for storing and growing sprouts are detachably mountable on each of the rack sets in tilted orientation relative to a horizontal plane. The bags are placed about each rack set so that in each tier they lie in circular rings disposed concentrically around the vertical axis of the mast.

Elongate light bulbs are disposed radially relative to the mast at an elevation above each shelf structure for directing light both upwardly and downwardly on the bags located next above and next below the bulbs. Conditioned air is circulated within the housing to maintain the temperature and relative humidity therein at approximately constant levels. The circulating air is also treated with fluorescent lights to eliminate any airborne bacteria and fungus.

As the bags and their corresponding shelf structure rotate about the longitudinal axis of the mast, water from a dispensing pipe located above each shelf structure, is periodically sprayed into each of the bags at a rate sufficient to thoroughly mix or turbulate the seeds located therein. The water draining from the bags drips to the sloped shelf structure disposed below, flows towards a shelf structure opening located adjacent the mast and then drops downwardly along the mast into a sump tank positioned adjacent the bottom of the housing. From the sump tank the water is pumped to a remote storage tank for subsequent recirculation. The water held within the storage tank is continuously pumped through a sand filter and then a charcoal filter to remove particulate matter and then is passed through a germicidal lamp which subjects the water to ultraviolet light to kill water borne bacteria and fungus.

It is a principal object of the present invention to provide an apparatus and method for hydroponically germinating seeds and growing sprouts in the same containers in which the sprouts are distributed to consumers and in large enough quantities to be economically feasible.

It is another object of the present invention to provide an apparatus and method for germinating seeds and growing sprouts in which the germinating and sprouting environment is maintained at a constant temperature and relative humidity and in which the air circulating about the sprouts is anti-bacterially treated.

It is a further object of the present invention to provide an apparatus and method for germinating seeds and growing sprouts in which the irrigation water used to germinate the seeds and grow the sprouts is continuously filtered and purified to thereby remove particulate matter and kill water borne bacteria and fungus.

Yet another object of the present invention is to provide a seed germinating and sprout growing apparatus and method in which the irrigation water is automatically supplied to the seeds and sprouts at periodic intervals and at a rate sufficient to thoroughly mix the seeds in each container to then minimize the possibility that fungus and bacteria will form therein.

One more object of the present invention is to provide a seed germinating and sprout growing apparatus and method in which substantially all of the irrigation water is recycled.

One other object of the present invention is to provide a seed germinating and sprout growing apparatus and method in which artificial light is directed to all the sprouts in the containers so that they will develop a uniform green color.

A further object of the present invention is to provide a seed germinating and sprout growing apparatus and method which minimizes the manual labor, electrical energy and floor space required to produce a maximum quantity of sprouts.

BRIEF DESCRIPTION OF THE DRAWINGS

FIG. 5 is a greatly enlarged, fragmentary, side elevational view.

DETAILED DESCRIPTION

Figure 1:
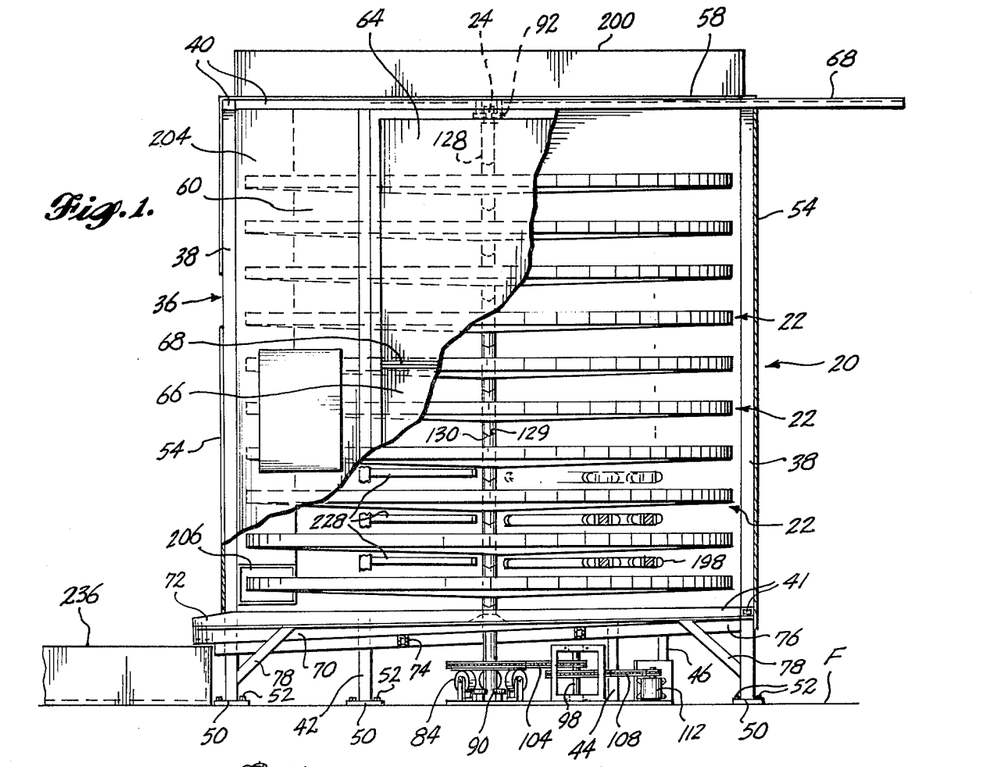
FIG. 1 is a front elevational view of one typical embodiment of the present invention with portions broken away.
Figure 6:
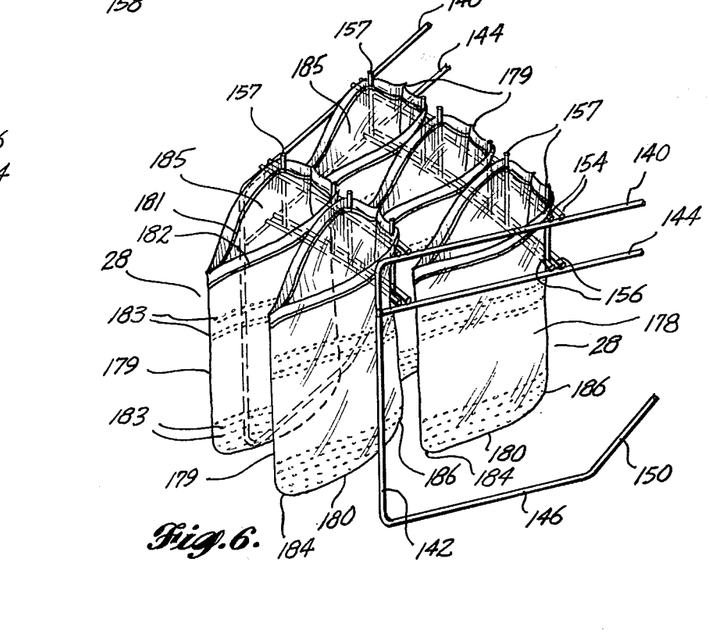
FIG. 6 is an enlarged fragmentary, perspective view of a portion of the typical embodiment of the present invention shown in FIG. 4 specifically illustrating the manner in which the containers are hung from an inner rack section.
Figure 7:
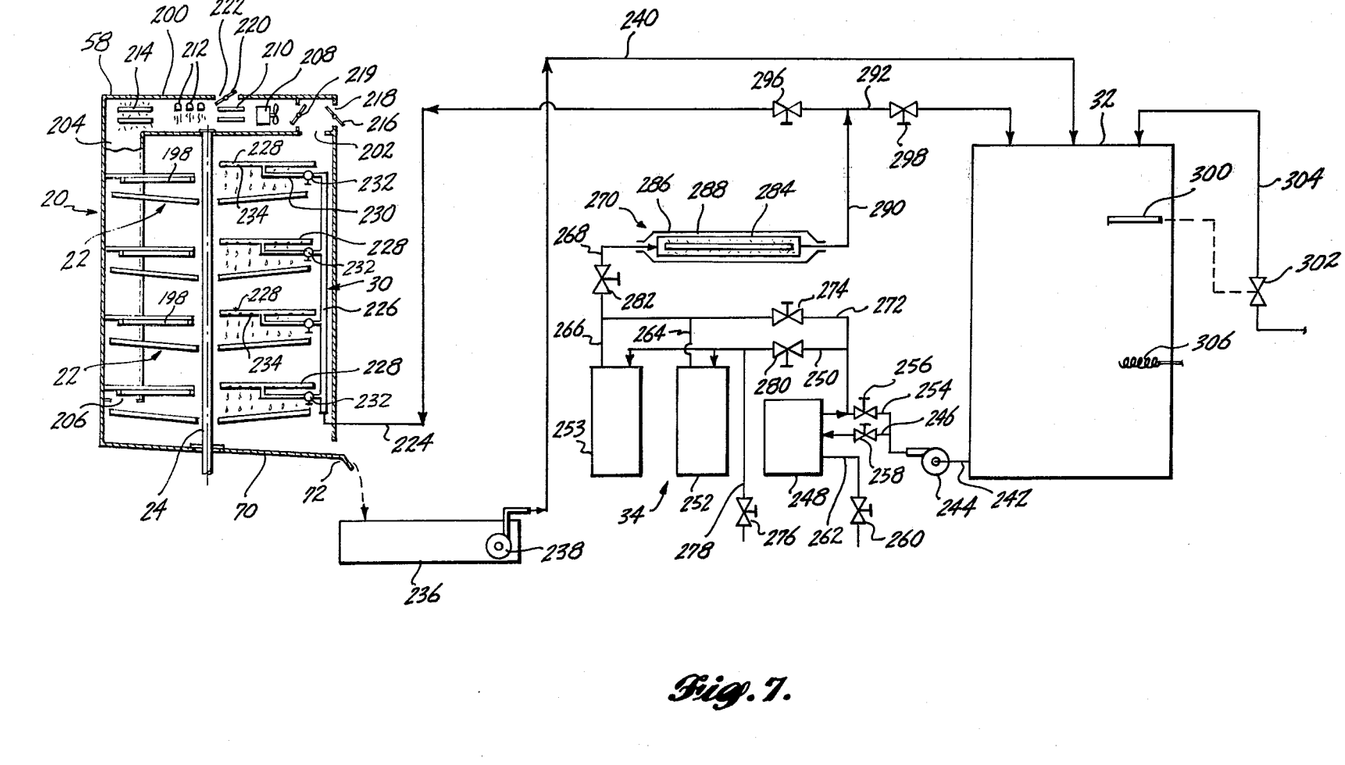
FIG. 7 is a schematic view of one typical embodiment of the present invention specifically illustrating the liquid delivery, recirculation, and liquid purification system, and the air circulation system within the housing.

Referring initially to FIGS. 1 and 7, a seed sprouting apparatus constructed according to the present invention basically comprises a housing 20 enclosing a plurality of vertically spaced tray structures 22 mounted on upright mast 24 which is supported to rotate about its longitudinal axis. Referring additionally to FIGS. 3-6, each tray structure 22 holds a plurality of wedge or circular segment shaped rack sets 26 which in turn support a plurality of perforated, upwardly open, seed growing receptacles or containers in the form of bags 28. Irrigation water is periodically supplied to bags 28 by a delivery and recirculation system 30, and to foster photosynthesis, artificial light is furnished to the sprouts after they have germinated. The used water which drains from bags 28 is collected in a remote storage tank 32 and from there is continuously pumped through a purification system 34 to remove particulate matter, bacteria, fungus, and other impurities from the water.

To sprout the seeds, bags 28 are initially mounted on rack sets 26 and then seeds are placed therein. The rack sets 26 are next placed within housing 20. The temperature and relative humidity of the air within housing 20 is maintained at constant levels to facilitate germination of the seeds and growth of the sprouts. Periodically, as mast 24 and tray structures 22 rotate, bags 28 are charged with purified irrigation water. After the seeds have sprouted, artificial light is directed on them. When the sprouts have reached a sufficient size, rack sets 26 are removed from housing 20 and the bags 28 removed from the rack sets 26 and sealed. The packaged sprouts are now substantially ready for distribution to consumers.

Figure 2:
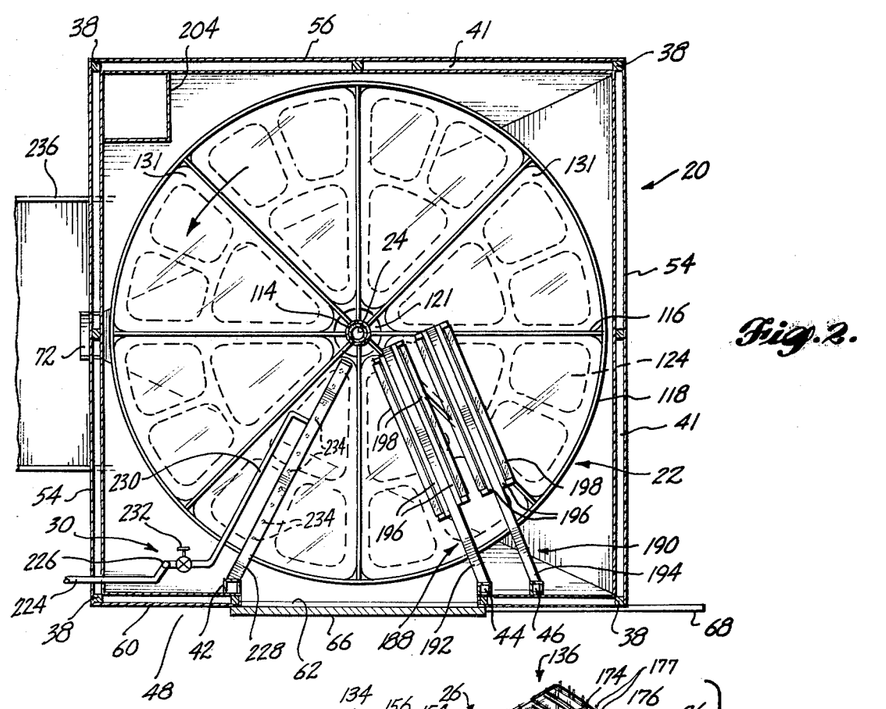
FIG. 2 is a cross-sectional view of the typical embodiment of the present invention shown in FIG. 1 as taken along lines 2—2 thereof and specifically illustrating a shelf structure.

Now referring specifically to FIGS. 1 and 2, housing 20 is constructed from a unitary frame structure 36 composed of four vertical posts 38 joined together by horizontally disposed upper cross members 40 interconnecting the upper end portions and lower cross members 41 interconnecting vertically intermediate portions of corner post 38 to form frame 36 in a substantially square shape. Frame 36 also includes three additional vertically disposed post members 42, 44, and 46 extending upwardly from floor F to interconnect upper and lower cross members 40 and 41, respectively, at the front side 48 of the housing 20. A floor contacting pad 50 is affixed to the bottom of each corner post 38 and to vertical members 42, 44 and 46. Fasteners such as bolts 52 extend through vertical openings provided in each pad 50 and engage with floor F to securely anchor housing 20.

The sides, rear and top of frame 36 are overlaid with panels 54, 56 and 58, respectively, while the front of frame 36 is overlaid with panel 60 having an opening 62. Opening 62 is covered by upper and lower sliding doors 64 and 66 which ride on horizontal tracks 68 mounted on front panel 60. The bottom of housing 20 is enclosed by an inclined floor 70 which slopes from right to left as viewed in FIG. 1. An outlet trough or spillway 72 extends laterally outwardly of the left edge of floor pan 70 as viewed in FIGS. 1 and 2. To support floor pan 70 and to further brace frame 36, a pair of cross braces 74 extend fore and aft directly below floor 70, to interconnect the lower front and rear lower cross members 41. Also, a pair of lateral cross braces 76 extend below floor 70 at right angles to fore and aft cross braces 74 to interconnect the other two lower cross members 41. The portions of corner posts 38 extending below lower cross members 41 serve as the legs for housing 20 and are braced to said lower cross members 41 by diagonal members 78.

To simplify the construction and to minimize the cost of fabricating housing frame 36, it is perferably that all of the structural components of said housing member be composed of the same type of structural members. Although it is not essential, it is preferable that square or rectangular tubing be used to construct housing frame 36 so that the panels 54–60 have flat surfaces to bear against when mounted to frame 36. However, other types of structural members such as angles or channels may also be utilized.

Figure 3:
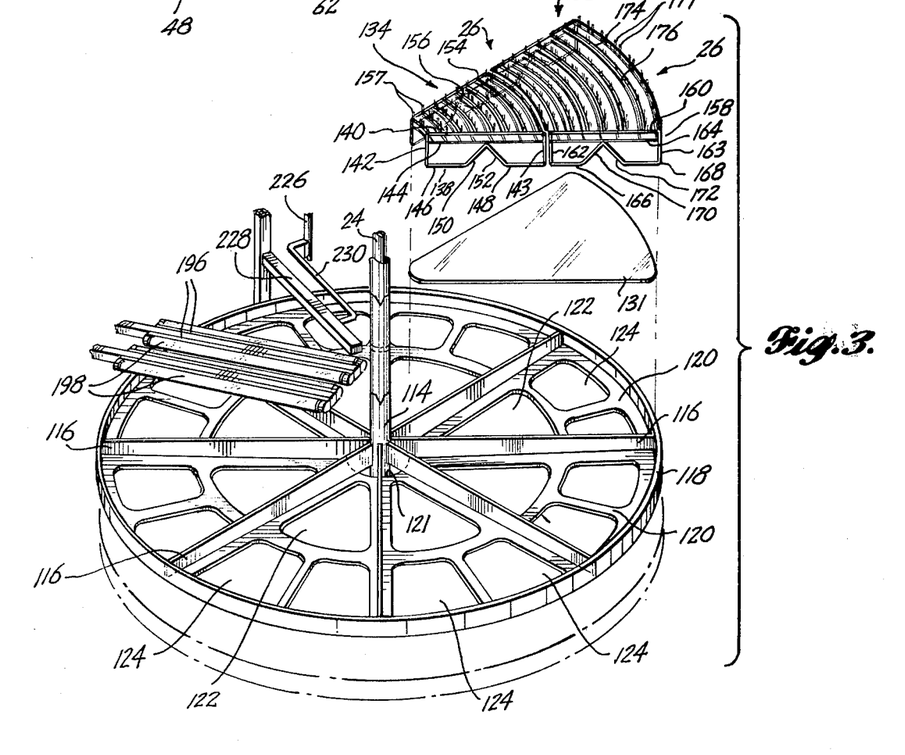
FIG. 3 is an enlarged, exploded, fragmentary isometric view of the shelf structure shown in FIG. 2.
Figure 8:
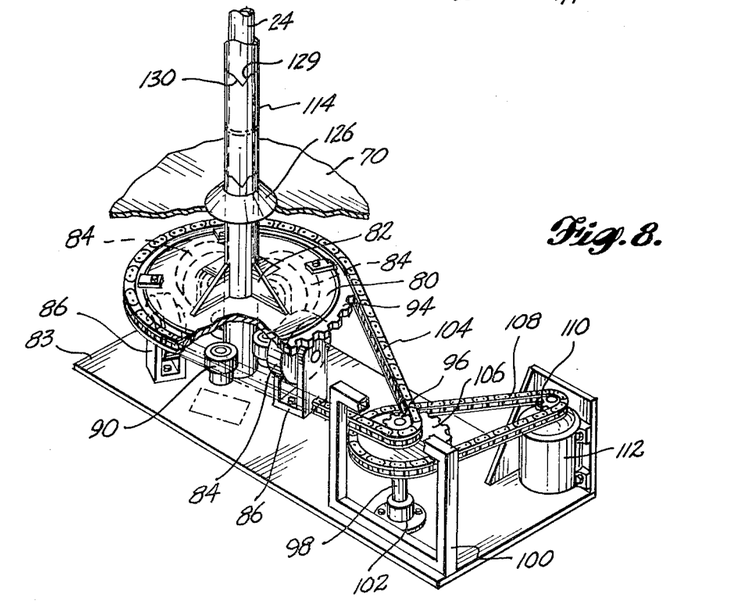
FIG. 8 is an enlarged, fragmentary isometric view of a portion of FIG. 1 with portions broken away specifically illustrating the mast drive mechanism.

Mast 24 is illustrated in FIGS. 1, 3 and 8 as constructed from a straight, elongate circular tubular member disposed vertically at the center of housing 20 and supported for rotation about its longitudinal axis. As best shown in FIG. 8, a circular, flat thrust plate 80 is coaxially engaged over the lower end portion of mast 24. Additionally, triangularly shaped gusset plates 82 are disposed around the circumference of mast 24 and welded to both said mast 24 and the top surface of thrust plate 80 to brace said two members together. From bearing plate 80, mast 24 extends both downwardly to almost the level of flat floor plate 83 and through an opening provided in floor pan 70 and upwardly to the top of housing 20, FIG. 1. Mast 24 is vertically supported by a plurality of castors 84 which roll against the bottom surface of thrust plate 80. Castors 84 are axled to U-shaped mounting brackets 86 which in turn are bolted to floor plate 83. Castors 84 are centered around mast 24 so that their lines of contact with the lower surface of thrust plate 80 lies tangentially to a theoretical circle which is concentric with mast 24. The lower end portion of mast 24 is radially located by a plurality of horizontally disposed bottom rollers 90 which are axled to bear against the circumference of the portion of mast 24 extending below thrust plate 80. Correspondingly, the upper end portion of mast 24 is radially located by a plurality of top rollers 92 which are axled to the upper portion of housing frame 36 to bear against the circumference of the upper end portion of mast 24, FIG. 1.

To rotate mast 24 about its longitudinal axis, an annularly shaped first sprocket 94 is bolted to circular thrust plate 80 to extend around the circumference thereof. First sprocket 94 is horizontally aligned with a second smaller sprocket 96 which is keyed to vertical jack shaft 98. Jack shaft 98 is antifrictionally journaled to an upright, rectangularly shaped perimeter frame 100 through the use of bearing members 102 attached to each end of jack shaft 98 and bolted to said frame 100. Frame 100 is in turn fixedly attached to floor plate 83 by any suitable method, such as by welding. A first chain 104 interconnects first and second sprockets 94 and 96, respectively. A third sprocket 106 is mounted on shaft 98 at an elevation below second sprocket 96 and is drivingly interconnected by second chain 108 to a fourth sprocket 110 mounted to a powered output shaft extending vertically upwardly from electric motor 112. Sizing first and third sprockets 94 and 96, respectively, larger than second and fourth sprockets 96 and 110, respectively, enables mast 24 to be rotated at a speed slower than the rotational speed of the output shaft of electric motor 112. Preferably mast 24 is rotated at approximately eight revolutions per minute.

Tray structures 22, as shown in FIG. 1, are mounted on and equally spaced along the height of mast 24 to rotate therewith. Although ten are pictured the particular number of tray structures 22 utilized can be varied to accommodate the height of housing 20. As illustrated in FIGS. 2 and 3, each tray structure 22 includes a central circular hub 114 encircling mast 24. Eight equally spaced spoke members 116 extend outwardly from the circumference of hub 114 to intersect a circular rim 118 and thereby divide the circular shape defined by each tray structure 22 into eight individual wedge or circular segment shaped areas. Spoke members 116 and rim 118 are rectangular in cross section, being greater in height than in width. A grid segment 120 spans beneath adjacent spoke members 116 to intersect said spoke members and rim 118 along their lower edge portions to thus serve as the floor for each tray structure 22. Accordingly, spoke members 116 and rim 118 extend upwardly beyond the top surface of their corresponding grid segment 120. The radially inward corner of each grid segment 120 has been cut away to leave a wedge shaped opening 121 adjacent mast 24. Each grid segment 120 also has a larger triangularly shaped opening 122 and a pair of outwardly located, generally rectangularly shaped openings 124. As a result of these three openings, almost the entire area of each grid segment 120 is open. As best shown in FIG. 3, spoke members 116 are not horizontally disposed, but rather rise upwardly as they extend radially outwardly from hub 114 so that grid segments 120 do not lie flat, but instead are also sloped upwardly as they also extend radially outwardly from hub 114.

Each circular hub member 114 has an inside diameter which is slightly larger than the outside diameter of mast 24 to permit them to slidably engage over mast 24 into vertical abutting relationship with each other. Since the length of each hub 114 is greater than the depth of spoke members 116, adjacent tray structures 22 are separated a uniform vertical distance above one another. Once engaged over mast 24 in abutting relationship, hubs 114 are clamped together between a lower collar 126, fixed to the lower end portion of mast 24 at an elevation slightly above floor pan 70 of housing 20 and an internally threaded upper collar 128 which engages with the threaded upper end portion of mast 24. To insure that all of the tray structures 22 simultaneously rotate together at the same speed with mast 24, central hubs 114 of each tray structure 22 are all interlocked together. This is accomplished by providing a V-shaped notch 129 at the upper edge portion of each hub member 114 for receiving a correspondingly shaped lower edge portion 130 of the next upwardly adjacent central hub 114, FIGS. 1 and 8.

As shown best in FIG. 3, a circular segment shaped cover panel 131 constructed of transparent or translucent material is placed over each generally correspondingly shaped grid segment 120. Each panel 131 is held in place by a pair of angularly adjacent spoke members 116 and the corresponding portion of circular rim 118. Preferably panels 131 are formed from tough, clear or translucent material such as plexiglass, fiberglass or tempered glass.

Each circular tray structure 22 supports a plurality of circular segment shaped rack sets 26 each of which are disposed about a center corresponding to the longitudinal axis of mast 24 to form a circular tier of racks on each tray structure 22. Each rack set 26 is shaped and sized to lie above one panel 131 and is constrained in such position by the portions of the angularly adjacent spoke members 116 and circular rim 118 which surround and extend above the upper surface of each panel 131. In this manner all of the rack sets 26 composing each tier can be located at the same radial distance from the longitudinal center of mast 24 so that the circular shaped tier formed by said rack sets 26 occupy substantially the entire surface of each tray structure 22.

Figure 4:
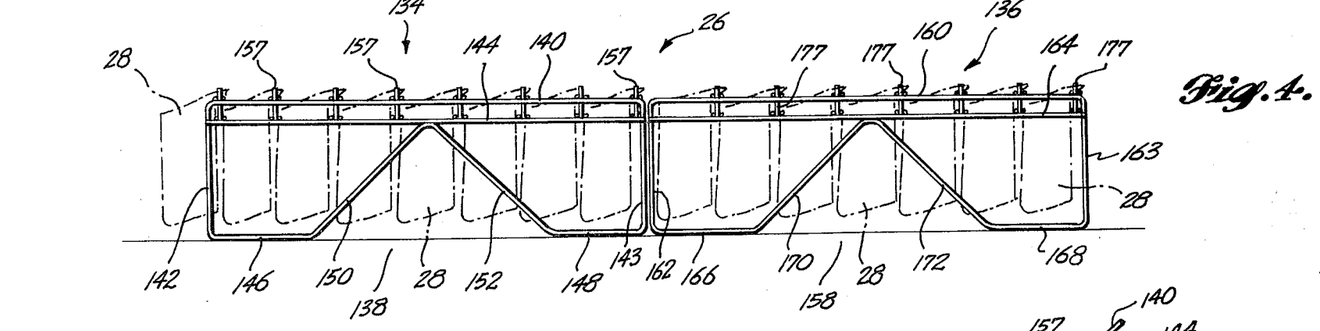
FIG. 4 is an enlarged side elevational view of one typical embodiment of the support racks of the present invention.

For ease of handling, each rack set 26 is composed of an inner section 134 and an outer section 136. Referring also to FIGS. 4 and 6, each rack inner section 134 is shown constructed from two upright, wire side frames 138 which are disposed relative to each other by an amount corresponding to the angle separating adjacent spoke members 116 of each tray structure 22. Each side frame 138 is formed by an elongate, horizontally disposed top member 140 having its ends joined to the upper end portion of shorter, vertically disposed column members 142 and 143. A second, elongate, horizontally disposed upper intermediate member 144 lies vertically below top member 140 and also interconnects the two column members 142 and 143. A first bottom member 146 is fixedly attached to the lower end of first column member 142 and extends horizontally toward second column member 143. Correspondingly, a second bottom member 148 extends from second column member 143 horizontally toward first column member 142. A first diagonal member 150 extends diagonally upwardly from the end of first bottom member 146 opposite first column member 142 to intersect upper intermediate member 144 at a location generally centrally along its length. Likewise, a second diagonal member 152 extends diagonally upwardly from the end of second bottom member 148 opposite second column member 143 to intersect upper intermediate member 144 at the same location where it joins first diagonal member 150. Thus, first and second diagonal members 150 and 152, respectively, form a downwardly open V-shape.

The top members 140 of the two side frames 138 are interconnected by a series of horizontally disposed arcuate cross ties 154. Likewise, intermediate side frame members 144 are interconnected by a series of arcuate cross ties 156 each of which lies vertically below a corresponding upper cross tie 154 to define sets of vertically spaced cross ties. The arcuate cross ties 154 and 156 are shaped to define radial segments of circles disposed concentrically about the longitudinal axis of mast 24 when rack inner sections 134 are placed on tray structures 22. Thus, cross ties 154 and 156 progressively increase in length in relation to the increasing diameter of each outwardly spaced circle which they partially define.

Pairs of spaced apart, upright posts 157 interconnect lower cross ties 156 and their corresponding upper cross ties 154 and then extend upwardly to an elevation above the upper cross ties. Starting from the two pairs of posts 157 which interconnect the radially inner mast cross tie set 156 and 154, the number of posts 157 increases by one pair with each radially outwardly succeeding set of cross ties so that the distance separating adjacent pairs of posts 157 remains essentially constant throughout all of the sets of cross ties.

As apparent from FIG. 3, each rack outer section 136 is constructed to be essentially a continuation of rack inner section 134. More specifically, each rack outer section 136 also includes a pair of vertical side frames 158 which are disposed relative to each other at the same angle which separates side frames 138 of inner section 134. Furthermore, each side frame 158 includes an elongate, horizontally disposed top member 160 having its ends joined to the upper end portion of first and second column members 162 and 163 respectively. Likewise, each side frame 158 also includes an elongate, horizontally disposed upper intermediate member 164 lying vertically below top member 160. A first bottom member 166 extends radially outwardly from the lower end of first column member 162 while a second bottom member 168 extends radially inwardly from the lower end of second column member 163. Also, a first diagonal member 170 rises diagonally upwardly from the end of first bottom member 166 opposite first column member 162 to interconnect upper intermediate member 164 centrally along its length while a second diagonal member 172 rises diagonally upwardly from the end of second bottom member 168 opposite second column member 162 to intersect upper intermediate member 164 at the same location where it joins first diagonal member 170.

Moreover, outer rack sections 136 also includes arcuate upper cross ties 174 which join side frame top members 160 and lower cross ties 176 which join side frame upper intermediate members 164 to form vertically spaced sets of cross ties. Cross ties 174, 176 are also radially spaced relative to each other to define circular segments concentrically disposed about a center defined by the theoretical intersection of top members 160 of the two side frames 158. This center also corresponds to the longitudinal axis of mast 24 when outer rack sections 136 are placed on tray structures 22.

Pairs of spaced posts 177 interconnect the corresponding upper and lower cross ties 174 and 176 and then rise to an elevation above said upper cross ties 174. The number of pairs of posts 177 disposed along the radially innermost cross tie set 174 and 176 is one more than the number of pairs of posts 156 disposed along radially outer most cross tie set 154 and 156 of rack inner section 134. Furthermore, as with rack inner section 134, the number of pairs of posts 177 increases by one pair with each succeeding radially outwardly located set of cross ties so that the distance separating pairs of posts 177 from adjacent pairs remains substantially constant throughout all of the sets of cross ties.

From the above description of rack inner sections 134 and outer sections 136, it can be appreciated that when said two rack sections are arranged in pairs and placed upon tray structures 22 to form a circular tier of racks, the corresponding arcuate cross tie sets 154 and 156 and 174 and 176 define concentric circular rings about the longitudinal axis of mast 24.

All of the structural components of rack inner section 134 and outer section 136 are preferably constructed of circular metal rod stock to minimize the fabrication costs and weight of each of said rack sections. However, other types of structural materials and other cross-sectional shapes can also be utilized such as, for instance, square or round tubing. Also, it is preferable that each rack inner section 134 and outer section 136 is coated or painted with a water impervious, fungus and mildew resistant covering such as natural or synthetic rubber, plastic or other similar materials. Of course, other rack structures and configurations could be substituted for those described above to accomplish the goal of supporting the seed containers compactly and in a manner to be described in greater detail hereafter.

Figure 5:
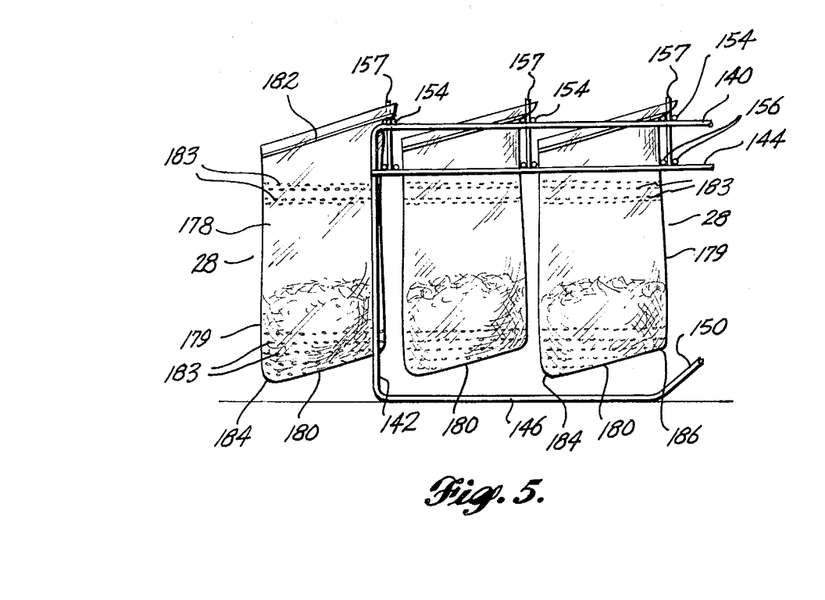

Now referring specifically to FIGS. 4-6, rack pairs 26 are illustrated as supporting a plurality of seed growing receptacles or containers in the form of bags 28. Each bag 28 is constructed from two generally rectangularly shaped sheets 178 of flexible, translucent material which have been joined together along their side and bottom edges to form seams 179 and 180, respectively, but which are open at their top 185. Each bag 28 does, however, have an integral formed channel 181 extending horizontally along an upper end portion of one sheet and an integral formed key strip 182 extending horizontally along the opposite sheet 178 to be receivable within and interlock with said channel 180 to close bag 28, for instance, after they are removed from rack pairs 26 when the sprouts are ready for consumption. At least the lower portions of each bag 28 includes perforations 183 that are large enough to permit the passage of irrigation water but small enough to prevent the passage of seeds. Perforations 182 also allow air to circulate through the bags 28 even when top 185 has been closed. The lower corners 184 and 186 of each bag 28 are rounded, rather than being sharp, so that seeds are not trapped therein.

It is preferable that sheets 178 are formed from clear plastic material so that light directed towards bags 28 may reach the sprouts once the seeds have germinated. Nevertheless, other materials, such as fabric woven from natural or synthetic fibers, may also be used. Moreover, flexible bags 28 may even be replaced by rigid, perforated, upwardly open containers formed from, for instance, clear plastic material.

Also, although bags 28 are rectangular in shape, they may be provided in other shapes such as triangular or cylindrical. The particular shape used, however, should not trap seeds in any location nor hinder the circulation of irrigation water supplied thereto.

Bags 28 are mounted on rack pairs 26 by simply forcing the upper edge portion of said bags downwardly over the pointed upper tip portions of a pair of posts 157 of inner sections 134 or posts 177 of outer sections 136 in the manner shown in FIG. 6. Preferably bags 28 are suspended from rack sections 134 and 136 so that the two posts 157 and 177, respectively, each pierce one of the two sheets 178 of each bag at a location adjacent one of the bag side seams 179. Ideally, side seam 179 is disposed centrally between the pair of posts 157 or 177, FIG. 6. Suspending bags 28 from rack pairs 26 in this manner permits bags 28 to tilt downwardly from rack sections 134 and 136 so that the bag lower corner 184 serves as a pocket in which unsprouted seeds tend to collect but are not trapped. As can be appreciated from the above description of the construction of rack sections 134 and 136, when said racks are arranged about a tray structure 22 to form a circular tier, bags 28 also are disposed in circular rings concentrically about the longitudinal axis of mast 24.

To aid the sprouts in their photosynthesis process, a pair of spaced, parallel artificial lighting sources 188 and 190 are disposed horizontally above each tray structure 22. Lighting sources 188 and 190 are constructed from elongate, cantilevered support arms 192 and 194, respectively, which have their fixed ends mounted to housing frame vertical member 44 and 46, respectively, and their free ends directed generally towards mast 24 so that said arms 192 and 194 lie generally radially with respect to said mast 24. Lighting sources 188 and 190 also include housings 196 for enclosing transformers, not shown, and for supporting fluorescent bulbs 198 horizontally outwardly from each side of and longitudinally along the length of arms 192 and 194. Preferably arms 192 and 194 are constructed from the same square tubing material used to construct housing frame 36; however, they may also be constructed from other structural components such as rectangular tubing, channels or I-beams.

It is to be appreciated that constructing shelf structures 22 with substantially open grid segments 120 overlaid by transparent or translucent panels 131 permits fluorescent light from sources 188 and 190 to both shine downwardly on the bags 28 supported by the next lower rack tier and upwardly through the next above tray structure 22 to reach the bags 28 supported by the next above rack tier. Thus, fluorescent light will reach essentially all of the sprouts located in each bag 28 permitting them to uniformly develop into a green color. Furthermore, by disposing fluorescent bulbs 198 generally radially with respect to mast 24 and rotating trays 22 about the longitudinal axis of said mast, only two lighting sources 188 and 190 are required by each tray structure 22 to provide a sufficient amount of light for the sprouts located in all of the bags 28 of each rack tier.

To provide optimum germinating and growing conditions, a circulation system forces air at a selective temperature and relative humidity through housing 20. The air circulation system, as best shown in FIGS. 1 and 7, includes a horizontal duct 200 disposed above and extending along the rear edge of housing top panel 58. As viewed in FIG. 7, an inlet opening 202 is provided in the right hand end portion of duct 200 to permit the entrance of air from within housing 20. The opposite end portion of duct 200 is in fluid flow communication with vertical duct 204 which extends downwardly along the left hand, rear corner of housing 20, as viewed in FIG. 2. Vertical duct 204 has a downwardly directed outlet 206 located at an elevation slightly above housing floor pan 70. Thus, air discharged through outlet 206 must flow around tray structures 22 and rise upwardly through housing 20 to reach horizontal duct inlet 202. Although ducts 200 and 204 are illustrated as being rectangular in cross section, other cross-sectional shapes, such as round or square, may also be used.

As shown schematically in FIG. 7, a fan 208 is located within duct 200 slightly downstream of inlet opening 202 to force air to flow through ducts 200 and 204. Electric resistance heating elements 210 are positioned adjacent fan 208 to heat the flowing air when desired. A plurality of water nozzles 212 are placed downstream of resistance heating elements 210 for selectively controlling the relative humidity of the air within chamber 20. This is accomplished by discharging water in a fine mist from nozzles 212 into the adjacent airstream. Furthermore, as also shown in FIG. 7, a plurality of fluorescent lighting tubes 214 are located within the end portion of horizontal duct 200 adjacent vertical duct 204. The light emitted from fluorescent bulbs 214 kills the airborne bacteria and fungus which may be circulating through housing 20.

It can be appreciated that the air circulation system not only insures that the temperature and relative humidity within housing 20 is maintained at levels for optimumly germinating seeds and growing sprouts, but also that the air is kept at a pressure above atmospheric pressure so that dust, bacteria and other impurities which may be suspended in the surrounding air, do not enter housing 20 even when doors 64 and 66 are opened.

Furthermore, the air circulation system also serves to evaporately cool the air flowing through housing 20. This is achieved by first opening exhaust valve 216 of opening 218 located at the end of horizontal duct 200 adjacent inlet opening 202 and closing recirculation valve 219 located between fan 208 and duct inlet opening 202 so that air leaving housing 20 exhausts out through said opening 218. Next outside air valve 220 of an opening 222 located downstream of fan 208 is opened to permit air to enter into duct 200. Air which enters through opening 222 is sprayed with a fine mist of cold water from nozzles 212 thereby causing such water to evaporate thus reducing the temperature of this air before it is discharged into housing 20.

In addition to lighting and air circulation systems, the present invention also includes an irrigation water or growing liquid delivery and recirculation system 30 to periodically supply the seeds, and later the sprouts, with a substantially uniform volume of purified water for proper germination of the seeds and growth of the sprouts. As best shown in FIGS. 2, 3 and 7, a water inlet line 224 extends through side panel 54 to intersect vertically disposed distributor conduit or pipe 226 located within housing 20. At an elevation above each tray structure 22, a dispensing conduit or pipe 228 is cantilivered horizontally from housing frame vertical member 42 to extend radially inwardly toward mast 24. Water enters each dispensing pipe 228 at a location intermediate its ends through line 230 which is also connected in fluid flow communication with distributor pipe 226. A flow control shut off valve 232 is located within line 230 at a location closely adjacent vertical pipe 226 so that water can be selectively supplied to one dispensing pipe 228 at a time.

A series of downwardly directed nozzles 234 are located along the underside of each dispensing pipe 228 with the position of each of said nozzles 234 corresponding to the location of the concentric rings defined by the bags 28 of each tier. Thus, as each tray structure 22 rotates about mast 24, water flowing downwardly through nozzles 234 enters the upwardly open bags 28. To provide each bag 28 with a substantially uniform volume of water, nozzles 234 from the end of dispensing pipe 228 adjacent frame structure vertical member 42 progressively decrease in size towards the free end of said dispensing pipe adjacent mast 24 by an amount corresponding to the decrease in the number of bags 28 in each progressively smaller circular ring of said bags. However, nozzles 234 are sized large enough to insure that water will flow into bags 28 at a fast enough rate to thoroughly mix the seeds therein.

Applicant has found that for some reason supporting bags 28 on rack pairs 26 so that they are tilted and then periodically charging each of said bags 28 with purified water at a fast enough rate to stir the seeds minimizes the likelihood that bacteria and fungus form within said bags and contaminate the sprouts.

Prior to their present configuration, bags 28 were constructed with square or sharp bottom corners 184 and 186. Seeds were often trapped in these corners and thus were not mixed with the others by the irrigation water. As a result, fungus and bacteria often formed in these corners and then quickly contaminated the rest of the seeds and sprouts. To prevent this from occurring, about twenty-four hours after they were intially placed within housing 20, rack sets 26 were removed so that a stream of high pressure water could be directed into corners 184 and 186 to insure that all of the seeds were adequately turbulated. Thereafter rack sets 26 were replaced within housing 20. Applicant has discovered that this time consuming, expensive manual operation could be eliminated by providing bags 28 with rounded lower corners 184 and 186 so that seeds are no longer lodged in the corners. Also, rounded corners 184 and 186 permit the irrigation water to more freely and completely circulate through the bags so that the seeds are thoroughly mixed solely by the water supplied by the dispensing pipes 228.

Because each underlying grid segment 120 is sloped toward mast 24, water which drains out of bags 28 through perforations 183 will flow along the top surface of cover panels 131 inwardly toward mast 24 and then downwardly through grid segment opening 121. The water eventually reaches housing sloped floor pan 70 and then flows out through outlet trough 72 and into open sump tank 236 located on floor F adjacent to the left hand side of housing 20 as viewed in FIGS. 1 and 2. A sump pump 238 is located within sump tank 236 to pump the used water through line 240 and into the top of open storage tank 32 wherein the water is held until it is again needed to irrigate the seeds and sprouts, FIG. 7.

The present invention also includes a system 34 for continuously purifying the water stored within tank 32 and then either returning the water to the top of said tank 32 or alternatively piping the water to housing 20. An outlet line 242 interconnects the inlet side of pump 244 with the bottom portion of tank 32. A line 246 connects the outlet side of pump 244 with the inlet side of sand filter 248 which removes the larger particles in the water. Line 250 interconnects the outlet side of sand filter 248 to the inlet sides of charcoal filters 252 and 253 which remove the smaller particles in the water. Additionally sand filter 248 has a line 254 and valve 256 which are in fluid flow communication with pump discharge line 246 and also with outlet line 250 through which lines water from tank 32 is pumped when back flushing said sand filter 248. Before back flushing occurs, valve 258 in line 246 must be first closed and valve 260 in sand filter drain line 262 opened.

Discharge lines 264 and 266 from the outlet side of sand filters 252 and 253 interconnect together to form a single line 268 leading to the inlet side of germicidal lamp 270.

A back flush line 272 interconnects sand filter outlet line 250 with outlet lines 264 and 266 of charcoal filters 252 and 253, respectively. To back flush charcoal filters 252 and 253, normally closed valve 274 in line 272 and 276 in drain line 278 must first be opened and normally open valves 280 in line 250 and 282 in line 268 must be closed. Switching these four valves permits water to enter the outlet sides of charcoal filters 252 and 253 through lines 264 and 266, respectively, and then exit through line 250 and then through drain line 278.

Germicidal lamp 270 includes an ultraviolet light source encased in a cylindrical quartz tube 284 which in turn is supported within a correspondingly shaped outer housing 286 thereby forming a thin, annularly shaped passage 288 therebetween through which filtered water from tank 32 passes. By the time the water reaches germicidal lamp 270, sand filter 248 and charcoal filters 252 and 253 have removed the particulate impurities so that the ultraviolet light can effectively pass through the water to kill germs and bacteria.

Purified water leaves germicidal lamp 270 through discharge line 290 which then branches into tank return line 292 and housing inlet line 224. When water is not being supplied to housing 20, valve 296 in housing inlet lines 224 is closed and valve 298 in tank return line 292 in open thereby permitting the purified water to return to tank 32. Alternatively, when periodically watering the seeds and sprouts growing in bags 28, valve 296 is opened and then valve 298 is closed. It can be appreciated that before water is piped to housing 20 from tank 32, it passes one last time through filtration system 240.

Make up water is automatically added to tank 32 to replace the water which has been either absorbed by the seeds or sprouts or lost by evaporation from sump tank 236 or storage tank 32. As shown in FIG. 7, this is accomplished by utilizing float valve 300 located within tank 32 to sense when the water has dropped below a predetermined level and then sending a signal to automatic flow control valve 302 located within water makeup line 304. Line 304 has its inlet connected to a supply source to discharge water from such supply source into the top of tank 32.

Water stored and flowing through tank 32 is maintained at a constant predetermined temperature by heater element 306 located within said tank 32 and controlled by a thermostat (not shown). It is preferable that water within tank 32 be heated to approximately 70 degrees.

To sprout seeds using the above described apparatus, bags 28 are first mounted on rack pairs 26 by pressing the upper edge portions of each bag downwardly over the upper end portions of pointed rack posts 157 and 177 so that one of the bag side seams 179 lies between said two posts 157 or 177. When suspended in this orientation, such seam 179 abuts against arcuate cross ties 154 and 156 of inner rack section 134 or 174 and 176 of rack outer section 136. Consequently bags 28 will tilt so that their outer bottom corner 184 will drop below the inner lower corner 186. Next a plurality of rack pairs 26 are placed upon each tray structure 22 to form a circular tier of racks located concentrically about the longitudinal axis of mast 24. Correspondingly, the bags 28 mounted on rack pairs 26 are disposed in concentric rings about the longitudinal axis of mast 24.

After rack sets 26 have been placed on tray structures 22, irrigation water is periodically discharged from dispensing conduit 228 downwardly into bags 28 as said tray structures 22 are rotated about the longitudinal axis of mast 24. It is preferred that this irrigation process occurs once every eight hours. Water is supplied to one tray structure 22 at a time so that it enters bags 28 at a fast enough rate to thoroughly mix the seeds located therein. The irrigation water leaves bags 28 through the perforations 183, falls downwardly onto sloped tray panels 131 and then flows toward mast 24, through tray structure openings 121 downwardly to sloped housing floor 70 and then finally out through spillway 72 and into sump tank 236.

From sump tank 236 the used irrigation water is pumped to storage tank 32 by sump pump 238. The water stored within storage tank 32 is continuously forced through a purification circuit 34 which filters and antibacterially treats the water to minimize the possibility that bacteria and fungus will form on the seeds or sprouts. If the water within tank 32 drops below a predetermined level, make up water is automatically added to the tank, and if the water within tank 32 drops below a predetermined temperature, it is automatically heated by electrical resistance coils 306.

After the seeds have sprouted, growing light from artificial lighting sources is directed toward bags 28. Since tray structure panels 131 are translucent, light reaches each bag 28 from lighting sources located both above and below each tray structure 22 that all of the sprouts within each bag 28 are supplied with a sufficient amount of growing light.

To provide an optimum germination and growing situation, conditioned air is continuously circulated through housing 20. The air is maintained at a constant temperature of approximately 80 degrees and a constant relative humidity of approximately 90 percent. Furthermore, airborne bacteria and fungus is subjected to fluorescent light from source 214 to minimize the likelihood that the seeds and sprouts will be contaminated thereby. Also, the air within housing 20 is pressurized above atmospheric pressure to prevent dust, bacteria and other impurities from entering housing 20.

When the sprouts have grown to a sufficient size, rack sets 26 are removed from tray structures 22, the bags 28 are lifted upwardly from said rack pairs 20 and then their tops 185 are closed to prevent the sprouts from spilling out. The sprouts are now ready for distribution and consumption. The entire growing process from the time the rack sets 26 are initially placed within housing 20 and then finally removed takes approximately 72 hours. During this time the seeds and the subsequent sprouts remain in the same bag 28 in which they are later distributed and sold so that no repackaging is required thus minimizing the extent to which the sprouts must be handled.

What is claimed is:

1. A seed sprouting apparatus comprising:
   (a) a plurality of rack means arranged about a center;
   (b) support means for supporting said rack means in spaced vertical tiers with the centers of each of said tiers of rack means substantially aligned along a vertical axis;
   (c) means for rotating said tiers of rack means about said vertical axis;
   (d) a plurality of translucent, upwardly open receptacles mountable on each of said rack means, each of said receptacles including liquid passing perforations in at least its lower portions;
   (e) an illumination source disposed between said tiers of rack means for directing light onto said receptacles; and
   (f) liquid delivery means for selectively directing liquid into each of said receptacles on said rack means while said tiers of rack means rotate about said vertical axis.

2. The seed sprouting apparatus according to claim 1, wherein said support means comprises:
   an upright mast aligned coaxially with the vertical axis defined by the centers of each of said tiers of rack means;
   means for supporting in upright orientation and for rotating said mast about its longitudinal axis; and
   a plurality of circular, partially translucent shelf structures mounted on said mast in spaced vertical relationship, each of said shelf structures being concentric with said mast and supporting one of said tiers of rack means.

3. The seed sprouting apparatus according to claim 2, wherein each of said shelf structures includes an underlying frame and translucent cover means overlying said frame.

4. The seed sprouting apparatus according to claim 3, wherein said underlying frame includes;
   a central hub encircling said mast;
   a plurality of spokes extending radially outwardly and diagonally upwardly from said hub;
   a substantially open grid segment spanning the area between said adjacent spokes, said grid segment forming a drain opening adjacent said mast; and a perimeter rim encircling said grid segments and interconnecting the outer end portions of each of said spokes.

5. The improvement according to claim 4, wherein said cover means includes a floor panel shaped correspondingly to and overlying each of said grid segments and disposed between adjacent spokes of said shelf support frame.

6. The seed sprouting apparatus according to claim 5, wherein said spokes and said perimeter rim extend above the elevation of said cover panel to contain the liquid draining from said receptacles and direct said liquid toward said grid segment drain opening.

7. The seed sprouting apparatus according to claim 2, wherein each of said circular shelf structures is sloped downwardly toward said mast, and includes an opening adjacent said mast to pass liquid downwardly through said support means.

8. The improvement according to claim 2, wherein said illumination source includes at least one elongate lighting tube disposed generally radially with respect to said mast to thereby direct light generally uniformly upwardly and downwardly toward said receptacles on the upwardly and downwardly adjacent tiers of rack means.

9. The seed sprouting apparatus according to claim 1, wherein said support means includes a plurality of circular, vertically spaced shelf structures, each of said shelf structures supporting a tier of rack means and adapted to rotate about the vertical axis defined by the centers of said tiers of rack means.

10. The seed sprouting apparatus according to claim 9, wherein each of said shelf structures includes:
a partially translucent floor, a rim extending upwardly from and encircling said floor; and
a drain opening located within said floor for passing used liquid draining from said receptacles supported by said shelf structure downwardly along the height of said support means.

11. The seed sprouting apparatus according to claim 1, wherein each of said rack means includes a plurality of pairs of upwardly extending posts, each of said pairs of posts being engageable with an upper edge portion of one of said receptacles to support said receptacle in tilted orientation relative to said rack means.

12. The seed sprouting apparatus according to claim 11, wherein each of said rack means is formed in the shape of a circle segment with said pairs of posts being disposed along arcuate rows lying generally concentrically about said vertical axis to thereby support said receptacles in each of said tiers of rack means in concentric rings about said vertical axis.

13. The improvement according to claim 11, wherein each of said rack means includes an inner triangularly shaped rack section and an outer annular segment shaped rack section, said two rack sections together forming a singular circular segment shape.

14. The improvement according to claim 1, wherein each of said rack means comprises:
a pair of upright side frames angularly disposed relative to each other about their corresponding tier center;
a plurality of arcuate cross tie means spanning across said side frames to form a series of circular ring segments disposed concentrically about said corresponding tier; and
a plurality of pairs of upright posts spaced along the length of each of said cross tie means, each of said pairs of posts being engageable with the upper edge portion of one of said receptacles to support said receptacle tilted relative to a horizontal plane.

15. The improvement according to claim 1, wherein each of said receptacles is constructed from flexible material with the perforations in each receptacle being of a size large enough to pass liquid therethrough but small enough to prevent unsprouted seeds from passing therethrough.

16. The improvement according to claim 15, wherein each of said receptacles is constructed from two rectangularly shaped sheets of said material joined together at their corresponding bottom and side edges, said sheets having rounded bottom corners to improve the circulation of the liquid within each of said containers to prevent seeds from being trapped in said corners.

17. The improvement according to claim 1, wherein said liquid delivery means includes;
a distributor conduit,
a horizontally disposed dispensing conduit located above each of said tiers of rack means and aligned generally radially with respect to its corresponding tier center, each of said dispensing conduits being in fluid flow communication with said distributor conduit; and
a series of downwardly directed spray nozzles located along the length of each of said dispensing conduits.

18. The improvement according to claim 17, wherein the orifices of said spray nozzles progressively decrease in size along the length of each of said dispensing conduits from said distributor pipe toward the tier center to thereby supply a substantially uniform quantity of liquid to each of said receptacles as said receptacles rotate about their corresponding tier center.

19. The improvement according to claim 1, further comprising means for recirculating and continuously purifying the liquid directed into said receptacles.

20. The improvement according to claim 19, wherein said means for recirculating and continuously purifying the liquid includes;
means for collecting the used liquid flowing out of said receptacles;
a storage tank for storing the liquid;
means for transporting said used liquid from said collecting means to said storage tank, and
purification means having its input from said storage tank and its output in fluid flow communication with both said delivery means and said storage tank.

21. The improvement according to claim 20, wherein said purification means comprises in fluid flow communication:
sand filter means;
charcoal filter means;
ultraviolet light treatment means for killing bacteria and fungus located in the recirculation liquid, and
a pump for pumping the liquid from said storage tank through said filtration means and alternatively either back to said storage tank or to said liquid delivery means.

22. In a seed sprouting apparatus having an enclosed housing and a system for circulating air to maintain the temperature and humidity within the housing at substantially constant levels, the improvement comprising:
(a) a plurality of translucent, generally horizontally disposed shelf structures vertically spaced within the housing;

(b) means for rotating said shelf structures about a substantially vertical axis;

(c) a plurality of rack means positionable on each of said shelf structures;

(d) a plurality of porous, translucent, seed sprouting containers suspended from each of said rack means at an elevation above its corresponding shelf structure;

(e) a light source disposed adjacent each of said shelf structures to direct light downwardly toward shelf structures located below said light source and upwardly through said shelf structures located above said light source; and (f) liquid recirculation means for periodically supplying a substantially uniform volume of anti-bacterially conditioned liquid to each of said seed sprouting containers and then collecting such liquid after it flows out from said containers.

23. The improvement according to claim 22, wherein said shell structure rotating means comprises:
a mast having its longitudinal axis aligned coaxially with the vertical axis of rotation of said shelf structures,
drive means for rotating said mast about its longitudinal axis, and
means for mounting said shelf structures along the height of said mast for rotation with said mast.

24. The improvement according to claim 22 or 23, wherein said rack means includes means engageable with an upper edge portion of each of said containers to support said containers in upwardly open and tilted orientations relative to said rack means.

25. The improvement according to claim 24, wherein each of said shelf structures is sloped radially inwardly and downwardly toward said mast to form an opening adjacent said mast and to permit any liquid draining from said containers to flow radially inwardly along each of said shelf structures toward said mast and then downwardly through said shelf structure opening.

26. The improvement according to claim 25, wherein:
each of said shelf structures is generally circular in shape, and
said rack means are arranged on each of said shelf structures and said bag engageable means are positioned about said rack means to support said containers in concentric circles about said mast.

27. The improvement according to claim 26, wherein said liquid recirculation means incluces a dispensing tube positioned above each of said shelf structures, and disposed generally radially relative to said concentric circles of containers, each of said dispensing tubes having downwardly directed nozzles for directing liquid into said containers.

28. The improvement according to claim 27, wherein said liquid recirculation means further comprises:
a used liquid collecting sump located below said shelf structure for collecting the liquid draining from said containers;
a storage tank having an inlet side and an outlet side;
means for transporting said used liquid from said collection sump to said storage tank; and
means for continuously purifying said used liquid, said purifying means being in fluid flow communication with the outlet side of said storage tank and with both the inlet side of said storage tank and said liquid dispensing tubes.

29. The improvement according to claim 28, wherein said purifying means includes means for directing ultraviolet light to said liquid to anti-bacterially treat said liquid.

30. The improvement according to claim 22, wherein each of said containers is constructed from two sheets of flexible material joined together along their corresponding side and bottom edges.

31. The improvement according to claim 30, wherein each of said sheets is composed of clear plastic, perforated material.

32. The improvement according to claim 22, further comprising means for treating the air circulated within the housing to kill airborne viruses, bacteria and fungus.

33. The improvement according to claim 32, wherein said housing circulating air treatment means comprises an air conduit system for directing air from the upper portion of the housing back down to a lower portion of the housing, and a purifying light source located within said air conduit system.

34. In a seed sprouting apparatus having an enclosed housing and a system for circulting air to maintain the temperature and humidity within the housing at substantially constant levels, the improvement comprising:
a plurality of racks;
a plurality of upwardly open, translucent, flexible bags mounted on said racks and adapted to hold seeds to be sprouted;
each of said bags including liquid passing perforations in its lower portion;
means for intermittently delivering liquid to each of said bags at a rate sufficient to turbulate said seeds; and
light source means above and below said bags to stimulate sprout growth.

35. The seed sprouting apparatus according to claim 34 wherein said bags are mounted on said racks to hang at an angle such that the seeds to be sprouted gravitate to the lowermost corner of said bag.

36. A method of sprouting seeds comprising:
(a) placing the seeds in a translucent, liquid pervious, seed impervious container;
(b) placing the container in a closed temperature and humidity controlled housing;
(c) tilting the container so that the seeds collect in the lowermost portion of the container;
(d) periodically supplying liquid to the container at a rate sufficient to mix the unsprouted seeds within the container; and
(e) subjecting the seeds to artificial growing light sources located both above and below the containers.

37. The method of sprouting seeds according to claim 36 further including the steps of collecting used liquid draining from said container, anti-bacterially treating and filtering said liquid and recirculating it to said container.

38. The method of sprouting seeds according to claim 36 wherein the step of filtering the used liquid includes passing the liquid through a sand filter and through an activated charcoal filter.

39. The method of sprouting seeds according to claim 36, further comprising arranging the containers about a center, and rotating the containers about the center when supplying liquid to each of the containers and when subjecting the sprouted seeds to the artificial light source.

40. The method of sprouting seeds according to claim 36, further comprising maintaining the environment surrounding the containers at a substantially constant temperature and relative humidity.

41. The method of sprouting seeds according to claim 40, further comprising maintaining the environment surrounding the containers at approximately 80° F. and at a relative humidity of approximately 90%.

42. The method of sprouting seeds according to claim 36, further comprising circulating air about the containers and treating such air with a light source to eliminate airborne bacteria and fungus.

43. A method for germinating seeds and growing sprouts, comprising:
  (a) suspending a plurality of perforated, translucent, upwardly open containers from racks so that each of the containers is tilted relative to a horizontal plane;
  (b) placing seeds in the containers;
  (c) arranging the racks about a center so that the containers are disposed in concentric circles about the center;
  (d) periodically supplying each of the containers with recirculated, filtered and antibacterially treated liquid at a rate sufficient to turbulate the seeds;
  (e) subjecting sprouted seeds to an artificial growing light source while simultaneously rotating the racks about their center; and
  (f) allowing said seeds to sprout and substantially fill said container.

44. The method of germinating seeds and growing sprouts according to claim 43, further comprising:
  locating the concentrically arranged containers in vertically spaced tiers in an enclosed housing;
  circulating air through the housing; and
  maintaining the circulated air at a generally constant temperature and relative humidity and at a pressure above atmospheric pressure.

45. The method of germinating seeds and growing sprouts according to claim 44, further comprising subjecting the air circulated through the housing to a light source to kill airborne bacteria and fungus.

46. The method of sprouting seeds and growing plants according to claims 43 or 44, wherein:
  the step of supplying each container with liquid further comprises discharging water downwardly into the containers along a line extending generally radially relative to the concentrically arranged containers while at the same time rotating the containers about their corresponding center; and
  the step of subjecting sprouted seeds to an artificial light includes disposing the artificial light source to extend generally radially relative to the concentrically arranged containers while at the same time rotating the containers about their corresponding center.

* * * * *